Aug. 19, 1969  F. H. DUNCAN  3,461,467
BOIL CONTROL
Filed Oct. 27, 1967  2 Sheets-Sheet 1
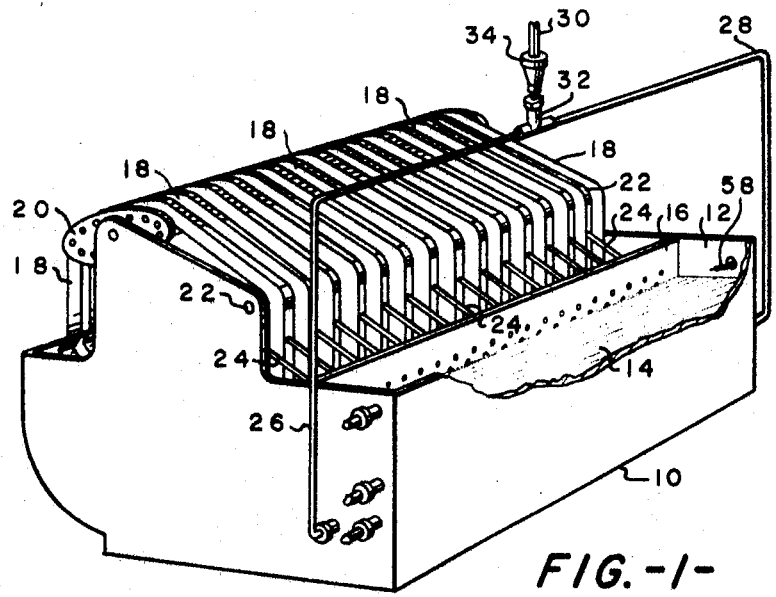
FIG.-1-
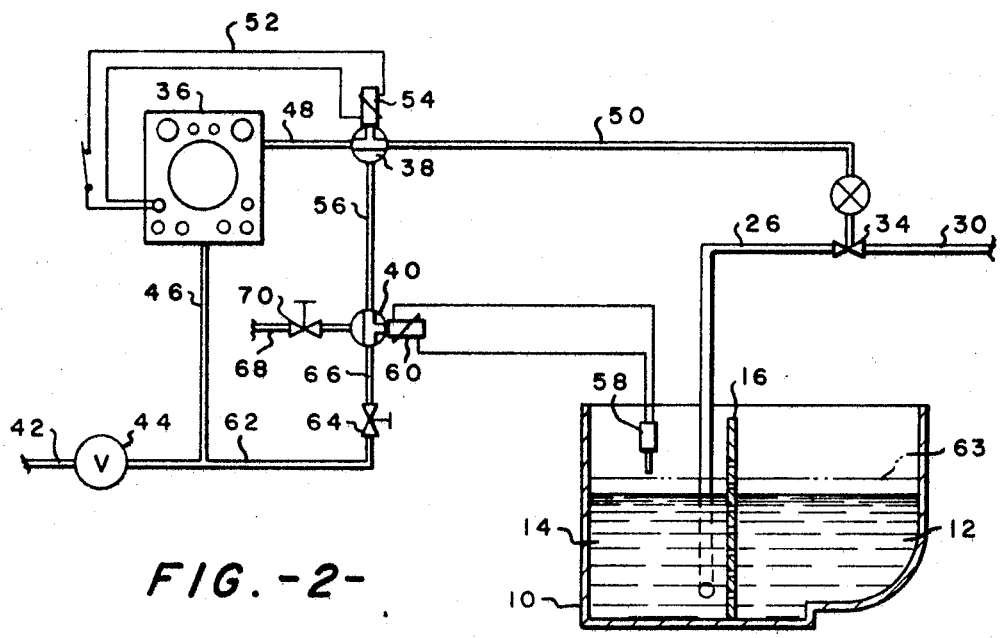
FIG.-2-
INVENTOR.
FREDERICK H. DUNCAN
BY
Earle R. Marden
ATTORNEY Aug. 19, 1969  F. H. DUNCAN  3,461,467
BOIL CONTROL
Filed Oct. 27, 1967  2 Sheets-Sheet 2
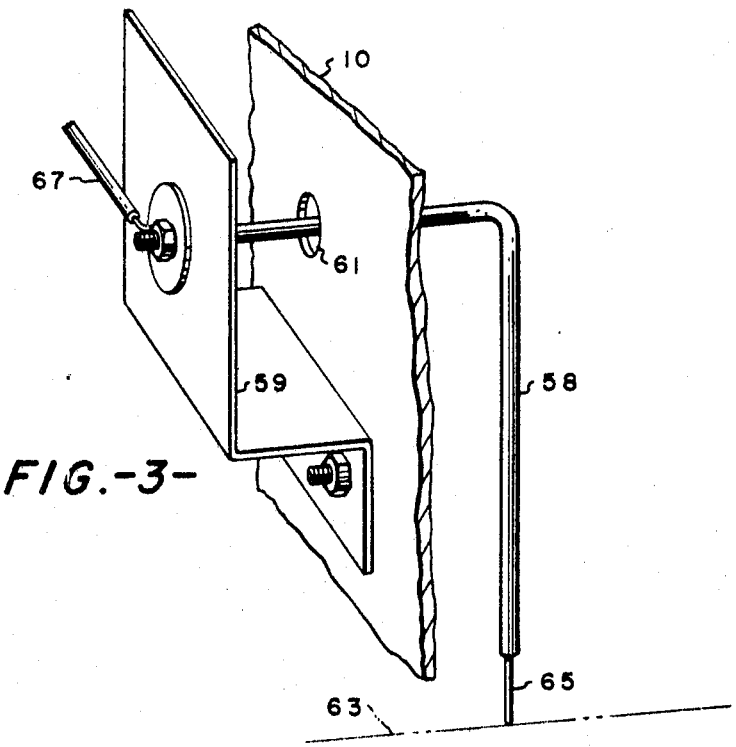
FIG.-3-
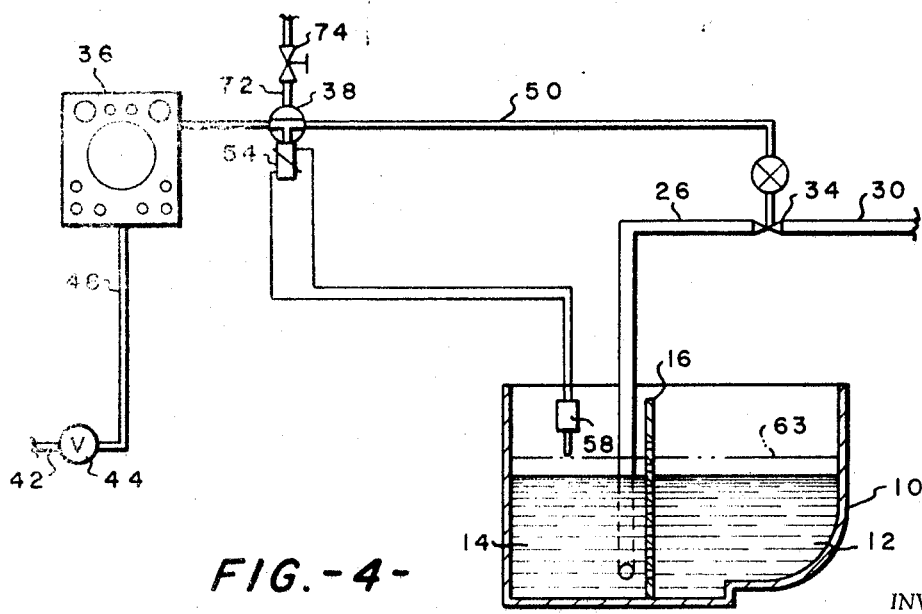
FIG.-4-
INVENTOR.
FREDERICK H. DUNCAN
BY
Earle R. Marsden
ATTORNEY United States Patent Office 3,461,467
Patented Aug. 19, 1969

3,461,467
BOIL CONTROL
Frederick H. Duncan, Clemson, S.C., assignor to Deering Milliken Research Corporation, Spartanburg, S.C., a corporation of South Carolina
Filed Oct. 27, 1967, Ser. No. 678,564
Int. Cl. C09c 3/02
U.S. Cl. 8—158                           8 Claims

ABSTRACT OF THE DISCLOSURE

This invention is directed to a boil control system for an atmospheric dye kettle. This system senses the boil level of the dye kettle to control the steam input to the dye kettle to control the boil level of the kettle.

---

This invention relates generally to novel apparatus to achieve improved control of fluid-treating process equipment and in particular to an improved boil control for an atmospheric dye kettle.

Fluid-treating processes generally involve the dissolution or dispersion of one material into another and the heating or cooling of the resulting system. The success of the process often hinges upon the degree of control over at least these process variables. Unfortunately, however, apparatus for providing the high degree of control required has not been developed to the same extent as the processes themselves, thereby forcing the operator to resort to alternative and less desirable practices.

These problems are particularly acute in the dyeing of textile materials, which involves the dissolution or dispersion of various dyestuffs in a suitable medium and periodically raising, lowering, and maintaining a given temperature. Some fabrics, such as those composed of wool or polyester fibers, have been extremely difficult to dye levelly because apparatus presently available is not capable of providing the control over the dyestuff concentration. This is especially true in controlling the boil in an atmospheric dye kettle where current methods of control result many times in boil over from the kettle onto the surrounding floor which not only results in loss of dyestuff but creates a problem in shade reproduction due to the loss of a certain amount of dyestuff. Current methods of boil control require temperature measurement which is connected to a control signal to preset the boil temperature. Theoretically this type control should perform the desired boil rate except that variables such as calibration of the instruments, atmospheric conditions, etc. which cannot be accurately compensated for in an atmospheric dye kettle change the theoretical boil rate and temperature resulting many times in boil over onto the floor or conversely, the kettle does not reach the desired temperature causing off shade fabric.

It is therefore an object of this invention to provide a boil control which will provide the maximum rate of boil regardless of variable surrounding conditions.

Another object of the invention is to provide a boil control means which will prevent boil over from the fluid-processing kettle.

A still further object of the invention is to provide an accurate boil level control which does not employ temperature as a means of control.

Other objects and advantages of the invention will become apparent as the specification proceeds to describe the invention with reference to the accompanying drawings, in which:

FIGURE 1 is a schematic representation of an atmospheric dye kettle;

FIGURE 2 is a schematic representation of one type of boil control;

FIGURE 3 is a blown up view of a typical boil level probe arrangement;

FIGURE 4 is a modification of the control shown in FIGURE 2.

Looking now to the drawings and especially FIGURE 1 the preferred form of the invention is illustrated as an atmospheric dye kettle 10 which is separated into a dye chamber 12 and a turbulence chamber 14 by a perforated plate 16. Continuous lengths of fabric 18 are passed continuously into and out of the dye chamber 12 over elliptically shaped feed roll 20 and guide roll 22 driven by a suitable motor (not shown). The plurality of fabric lengths are separated by separator bars 24 to prevent overlapping of the fabric lengths 18 which would interfere seriously with the levelness of the dyeing operation. Steam is supplied to the turbulence chamber 14 at each end by steam lines 26 and 28 connected to the main steam line 30 through a T connection 32 and a modulating steam valve 34. Steam lines 26 and 28 project part way across the bed of chamber 14 and are perforated to allow steam to bubble up through the liquid in the chamber.

Looking now to FIGURE 2 the preferred control system is illustrated and will be explained hereinafter. Reference numeral 36 represents a standard commercially available process control instrument which normally includes a timer to start and stop the process, a control to bring the temperature of the process up at a predetermined rate and a control to hold the process at a preset condition.

When the process control instrument is energized to start a new dyeing process solenoid actuated three-way valves 38 and 40 are in the position shown and compressed air is being supplied through conduit 42, pressure regulating valve 44, conduit 46, control instrument 36, conduit 48, three-way valve 38 and conduit 50 to valve 34 to supply steam from steam line 30 into the turbulence chamber 14 via steam line 26. In normal operation the compressed air from the control instrument 36 to the steam valve 34 is controlled to provide a predetermined temperature rise in the turbulence chamber 14. When the temperature in the dye kettle 10 reaches the preselected temperature, the control instrument 36 will energize the circuit 52 to supply current to the solenoid coil 54 to actuate valve 38 to place conduit 56 in communication with conduit 50 and thereby locking out the control instrument 36 until the built-in timer indicates that the process is complete. Normally the cut-out temperature of the control instrument is the theoretical boil temperature of the dye kettle 10 but as pointed out before such control is not completely accurate so a boil level control instrument 58 is mounted in the turbulence chamber 14 through the wall thereof to take over control of the boil level when the control instrument 36 locks itself out.

Assuming that the liquid in the dye kettle 10 has not reached the boil point when the control instrument 36 locks itself out the solenoid coil 60 will not be energized and the valve 40 will be in the position shown in FIGURE 2. Since conduit 48 is now closed by valve 38 compressed air from pressure regulating valve will flow through conduit 62, throttle valve 64, conduit 66, three-way valve 40, conduit 56, three-way valve 38 and conduit 50 to steam valve 34 to continue the supply of steam to the dye kettle 10. When the liquid in the kettle 10 reaches a boil the boil head or level 63 will contact the boil level control instrument 58 to complete the circuit to the solenoid coil 60 to actuate three-way valve 40 to place conduit 56 in communication with the exhaust conduit 68 and to close off conduit 66. A throttling valve 70 is located in exhaust conduit 68 to throttle the flow of air through the conduit 68 so that steam valve 34 modulates open and closed rather than slamming open and slamming closed. As long as the timer of the control instrument 36 does not time out the process, the boil level probe will automatically sense the boil level or head 63 to control the position of the valve 40 to either exhaust air through conduit 68 to close the steam valve 34 when the boil head is in contact with the probe 58 or supply compressed air to the steam valve 34 when the boil head is below and not in touch with probe. When the process cycle is complete the time of the control instrument 36 will de-energize the solenoid 54 to return the valve 38 to the position shown in FIGURE 2 and the control instrument 36 will once again take over control of the dye kettle to control the cooling of the dye kettle 10.

FIGURE 3 shows a typical arrangement of a boil level probe 58. The probe 58 is connected to plate 59 and projects through an opening 61 in the side of the kettle 10. When the boil level 63 reaches the tip 65 of the probe 58 a circuit is completed through the liquid in the kettle from the kettle wall to the wire lead 67 which energizes the circuit to the solenoid valve 60.

FIGURE 4 is a simplified version of the dye kettle control shown in FIGURES 1–3. In FIGURE 4 like reference numerals refer to like parts of FIGURES 1 and 2. The basic difference between FIGURES 1 and 2 and FIGURE 3 is that the additional three-way valve and associated pipes and lines have been eliminated. In the modification of FIGURE 3 the control instrument during the process cycle is set above the boil temperature of the dye kettle so it attempts to constantly supply air to the valve 34. Then the probe 58 controls the position of the valve 38 to either allow the air from the controller to be supplied to the steam valve 34 when the boil head is not in contact with the probe or to exhaust air from the conduit 50 through conduit 72 and throttle valve 74 when the boil level or head is in contact with the level control 58 to allow the steam valve 34 to close. As in the modification of FIGURES 1 and 2 the level control controls the position of the valve 38 to control the flow of compressed air to the steam valve. When the process cycle is complete the controller 36 will again take over since the time will cut out the demand for steam by the controller 36 and the valve 38 will be in the position shown since the boil head will be below the probe 58.

It is obvious that the herein described invention provides a system which measures the physical characteristics of the kettle to control the amount of boil in the kettle to efficiently prevent boil over from the kettle thereby reducing the loss of dyestuff from the process providing a much better control of the shade characteristics of the fabric being dyed.

Although I have described in detail the preferred embodiments of my invention, it is contemplated that many changes may be made without departing from the scope or spirit of my invention and I desire to be limited only by the claims.

I claim:

1. An apparatus to fluid treat textile materials comprising: a fluid treating container, means to supply heat to said container, and means to control the supply of heat to said container, said means including a control to sense the level of boil of the fluid in said container.

2. The structure of claim 1 wherein said means to supply heat to said container is a steam line including a steam valve, said means to sense the level of boil closing said steam valve when contacted by the level of boil in said container.

3. The structure of claim 2 wherein said heat control means includes a time controlled process controller to control the rate of temperature rise in said container and the rate of cooling in said container.

4. Apparatus to fluid treat textile materials comprising: a fluid treating container, means to supply steam to said container, valve means operably associated with said steam supply means, a process control means operably associated with said valve means to control the rate of heating said container and the rate of cooling said container, a boil level control means in said container above the liquid therein, and means operably associated with boil level control means and said valve means to open said valve means when the boil level is below said boil level control means and to close said valve means when said boil level of the liquid in said container contacts said boil level control means.

5. The structure of claim 4 when said means to open and close said valve means includes a three-way valve operably associated with said boil level control means and said process control means.

6. The structure of claim 5 wherein said means to open and close said valve includes a second three-way valve means actuated by said boil control means.

7. The structure of claim 6 wherein said ocntainer contains at least two sections, one of said sections being supplied steam while the other of said sections is adapted to treat textile materials therein.

8. The method of controlling the level of boil in a textile fluid, treating apparatus comprising the steps of: supplying heat to said textile fluid, treating apparatus and sensing the height of boil of the liquid in the apparatus to control the supply of heat to the apparatus.

References Cited

UNITED STATES PATENTS 3,094,859   6/1963   Isley et al. _____ 68—15

WILLIAM I. PRICE, Primary Examiner

U.S. Cl. X.R.

68—12, 15, 207